United States Patent
Pringnitz (10) Patent No.: US 11,134,673 B2
(45) Date of Patent: Oct. 5, 2021

(54) TELESCOPIC GAME CALL HAVING ADJUSTABLE RESONANT LENGTH

(71) Applicants: Tree Thrasher, LLC, Mount Pleasant, IA (US); Katie Pringnitz

(72) Inventor: Todd Pringnitz, Mount Pleasant, IA (US)

(73) Assignee: Tree Thrasher, LLC, Mount Pleasant, IA (US)

( * ) Notice: Subject to any disclaimer, the term of this patent is extended or adjusted under 35 U.S.C. 154(b) by 0 days.

(21) Appl. No.: 16/748,894

(22) Filed: Jan. 22, 2020

(65) Prior Publication Data
US 2020/0229423 A1    Jul. 23, 2020

Related U.S. Application Data

(60) Provisional application No. 62/795,722, filed on Jan. 23, 2019.

(51) Int. Cl.
*A01M 31/00* (2006.01)
*G10K 9/02* (2006.01)

(52) U.S. Cl.
CPC ............. *A01M 31/004* (2013.01); *G10K 9/02* (2013.01)

(58) Field of Classification Search
CPC ............................... A01M 31/004; G10K 9/02
USPC .......................... 446/202, 203, 207, 208, 209
See application file for complete search history.

(56) References Cited

U.S. PATENT DOCUMENTS

| | | | | | |
|---|---|---|---|---|---|
| 333,094 | A | * | 12/1885 | Fuller | A01M 31/004 446/208 |
| 728,083 | A | * | 5/1903 | Childers | G10D 7/12 446/209 |
| 853,148 | A | * | 5/1907 | Alter | G10D 7/12 446/209 |
| 1,484,148 | A | * | 2/1924 | Olt | A63H 5/00 446/208 |
| 2,072,786 | A | * | 3/1937 | Yager | 446/208 |
| 2,544,370 | A | * | 3/1951 | Walther | G10D 7/12 446/208 |
| 2,556,388 | A | * | 6/1951 | Biocchi | 446/208 |
| 2,604,731 | A | * | 7/1952 | Meucci | 446/208 |
| 2,730,836 | A | * | 1/1956 | Faulk | G10D 17/00 446/207 |
| 2,737,757 | A | * | 3/1956 | Liebelt | G10K 5/00 446/205 |
| 2,782,558 | A | * | 2/1957 | Harley | A01M 31/004 446/207 |
| 2,915,851 | A | * | 12/1959 | Ringman | G10K 5/00 446/206 |
| 3,066,444 | A | * | 12/1962 | Dieckmann | 446/207 |
| 3,327,579 | A | * | 6/1967 | Brimhall | G10D 7/14 84/375 |

(Continued)

*Primary Examiner* — Joseph B Baldori
(74) *Attorney, Agent, or Firm* — Price Heneveld LLP (57) ABSTRACT

A game call includes a first resonant member. A second resonant member is telescopically operable within the first resonant member between a plurality of telescopic positions. A harmonic carriage has a body and a reed assembly. The harmonic carriage is slidably operable within the second resonant member. The first and second resonant members and the harmonic carriage are slidably operable relative to one another to adjust a resonant length defined between the reed assembly and a resonating end of the first resonant member.

16 Claims, 9 Drawing Sheets

(56) References Cited

U.S. PATENT DOCUMENTS

| | | | | | |
|---|---|---|---|---|---|
| 3,466,794 | A | * | 9/1969 | Mcbroom | A01M 31/004 446/206 |
| 3,656,258 | A | * | 4/1972 | Thomas | A01M 31/004 446/208 |
| 3,772,823 | A | * | 11/1973 | Herter | G10D 17/00 446/209 |
| 3,802,120 | A | * | 4/1974 | Erhart | A01M 31/004 446/77 |
| 3,928,935 | A | * | 12/1975 | Beadles, Jr. | A63H 5/00 446/208 |
| 4,034,499 | A | * | 7/1977 | Wild | A63H 5/00 446/215 |
| 4,116,108 | A | * | 9/1978 | Hyman | G10D 7/00 446/213 |
| 4,143,485 | A | * | 3/1979 | Stewart | A63H 5/00 446/207 |
| 4,179,845 | A | * | 12/1979 | Jacob | G10K 9/02 446/188 |
| 4,576,584 | A | * | 3/1986 | Hill | A01M 31/004 116/137 R |
| 4,642,065 | A | * | 2/1987 | Whedon | A01M 31/004 446/209 |
| 4,737,130 | A | * | 4/1988 | Mann | A01M 31/004 446/207 |
| 4,940,451 | A | * | 7/1990 | Leady | A01M 31/004 446/202 |
| 4,950,198 | A | * | 8/1990 | Repko, Jr. | A01M 31/004 446/202 |
| 4,997,402 | A | * | 3/1991 | Blease | A01M 31/004 116/137 R |
| 5,090,937 | A | * | 2/1992 | LaRue | A01M 31/004 446/207 |
| 5,113,784 | A | * | 5/1992 | Forselius | G10K 5/00 116/137 R |
| 5,122,088 | A | * | 6/1992 | Meline | A01M 31/004 446/202 |
| 5,234,368 | A | * | 8/1993 | Carraway | A01M 31/004 446/202 |
| 5,251,569 | A | * | 10/1993 | Seron | G10K 5/00 116/137 R |
| 5,495,820 | A | * | 3/1996 | Seron | G10K 5/00 116/137 R |
| 5,577,946 | A | * | 11/1996 | Oathout | A01M 31/004 446/207 |
| 5,643,039 | A | * | 7/1997 | McIntyre | A01M 31/004 446/208 |
| 5,885,126 | A | * | 3/1999 | Carlson | A01M 31/004 446/208 |
| 5,975,978 | A | * | 11/1999 | Hall | A01M 31/004 446/208 |
| 6,039,627 | A | * | 3/2000 | Forbes | A01M 31/004 446/208 |
| 6,083,075 | A | * | 7/2000 | Meeks | A01M 31/004 181/182 |
| 6,152,798 | A | * | 11/2000 | Raburn | A01M 31/004 446/207 |
| 6,413,140 | B1 | * | 7/2002 | Primos | A63H 5/00 446/202 |
| 6,547,627 | B1 | * | 4/2003 | Oathout | B63B 25/002 446/208 |
| 6,575,804 | B1 | * | 6/2003 | Primos | A01M 31/004 446/193 |
| 6,783,422 | B1 | * | 8/2004 | Bean | A01M 31/004 446/202 |
| 7,070,473 | B1 | * | 7/2006 | Cassette | A01M 31/004 446/207 |
| 7,083,492 | B1 | * | 8/2006 | Morocco | A01M 31/004 446/202 |
| 7,145,067 | B2 | * | 12/2006 | Pfortmiller | A01M 31/004 84/380 R |
| 7,465,213 | B1 | * | 12/2008 | Pribbanow | A01M 31/004 446/202 |
| 7,637,795 | B1 | * | 12/2009 | Dukart | A01M 31/004 446/207 |
| 8,469,765 | B2 | * | 6/2013 | Nolz | A01M 31/004 446/202 |
| 8,672,725 | B1 | * | 3/2014 | Betts | A01M 31/004 446/207 |
| 9,326,499 | B1 | * | 5/2016 | Gant | A01M 31/004 |
| 9,622,467 | B2 | * | 4/2017 | Wiley | A01M 31/004 |
| 10,080,361 | B2 | * | 9/2018 | Thomas | A01M 31/004 |
| 2003/0116078 | A1 | * | 6/2003 | Topman | G10K 5/00 116/137 R |
| 2007/0037471 | A1 | * | 2/2007 | Pepin | A01M 31/004 446/207 |
| 2009/0017717 | A1 | * | 1/2009 | Marini | A01M 31/004 446/207 |
| 2012/0028536 | A1 | * | 2/2012 | Jacobsen | A01M 31/004 446/207 |
| 2014/0051323 | A1 | * | 2/2014 | Oathout | A01M 31/004 446/207 |
| 2014/0065924 | A1 | * | 3/2014 | Dillon | A01M 31/004 446/202 |
| 2014/0106643 | A1 | * | 4/2014 | Powers | A01M 31/004 446/418 |
| 2014/0213141 | A1 | * | 7/2014 | Hassinger | A01M 31/004 446/188 |
| 2016/0242408 | A1 | * | 8/2016 | Betts | A01M 31/004 |
| 2017/0000108 | A1 | * | 1/2017 | Bean | A01M 31/004 |
| 2017/0055518 | A1 | * | 3/2017 | Thomas | A01M 31/004 |
| 2019/0110463 | A1 | * | 4/2019 | Pringnitz | A01M 31/004 |
| 2019/0230916 | A1 | * | 8/2019 | Schweitzer | A01M 31/004 |
| 2019/0357522 | A1 | * | 11/2019 | Betts | A01M 31/004 |
| 2020/0229423 | A1 | * | 7/2020 | Pringnitz | G10K 9/02 |

* cited by examiner

TELESCOPIC GAME CALL HAVING ADJUSTABLE RESONANT LENGTH

CROSS-REFERENCE TO RELATED APPLICATION

This application claims priority to and the benefit under 35 U.S.C. § 119(e) of U.S. Provisional Patent Application No. 62/795,722 filed on Jan. 23, 2019, entitled TELESCOPIC GAME CALL HAVING ADJUSTABLE RESONANT LENGTH, the entire disclosure of which is hereby incorporated herein by reference.

FIELD OF THE INVENTION

The present invention generally relates to animal calls, and more specifically, a game call that includes a carriage assembly that is operable to modify the tone of the game call.

BACKGROUND OF THE INVENTION

Many outdoor enthusiasts use various calls to mimic the sound of animals in the wild. One such call is a grunt call or game call that can be used to mimic various vocalizations of animals that may be used to lure animals within the range of the observer or hunter.

SUMMARY OF THE INVENTION

According to one aspect of the present invention, a game call includes a first resonant member. A second resonant member is telescopically operable within the first resonant member between a plurality of telescopic positions. A harmonic carriage has a body and a reed assembly. The harmonic carriage is slidably operable within the second resonant member. The first and second resonant members and the harmonic carriage are slidably operable relative to one another to adjust a resonant length defined between the reed assembly and a resonating end of the first resonant member.

According to another aspect of the present disclosure, a game call includes a first resonant member. A second resonant member is telescopically operable within the first resonant member between a collapsed position and a plurality of extended positions. A harmonic carriage is slidably operable within the second resonant member. The harmonic carriage is harmonically isolated from the first resonant member by at least one elastomeric gasket. The first and second resonant members and the harmonic carriage are slidably operable relative to one another to adjust a resonant length defined between a reed assembly and a resonating end of the first resonant member.

According to yet another aspect of the present disclosure, a game call includes a first resonant member. A second resonant member is telescopically operable within the first resonant member between a collapsed position and a plurality of extended positions. A plurality of harmonic carriages are selectively and alternatively installed within the second resonant member. Each harmonic carriage of the plurality of harmonic carriages includes a dedicated reed assembly having a predetermined sound signature. Each harmonic carriage is configured to be harmonically isolated from the first resonant member by at least one elastomeric gasket. The first and second resonant members and a selected harmonic carriage of the plurality of harmonic carriages are slidably operable relative to one another to adjust a resonant length defined between the reed assembly of the selected harmonic carriage and a resonating end of the first resonant member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
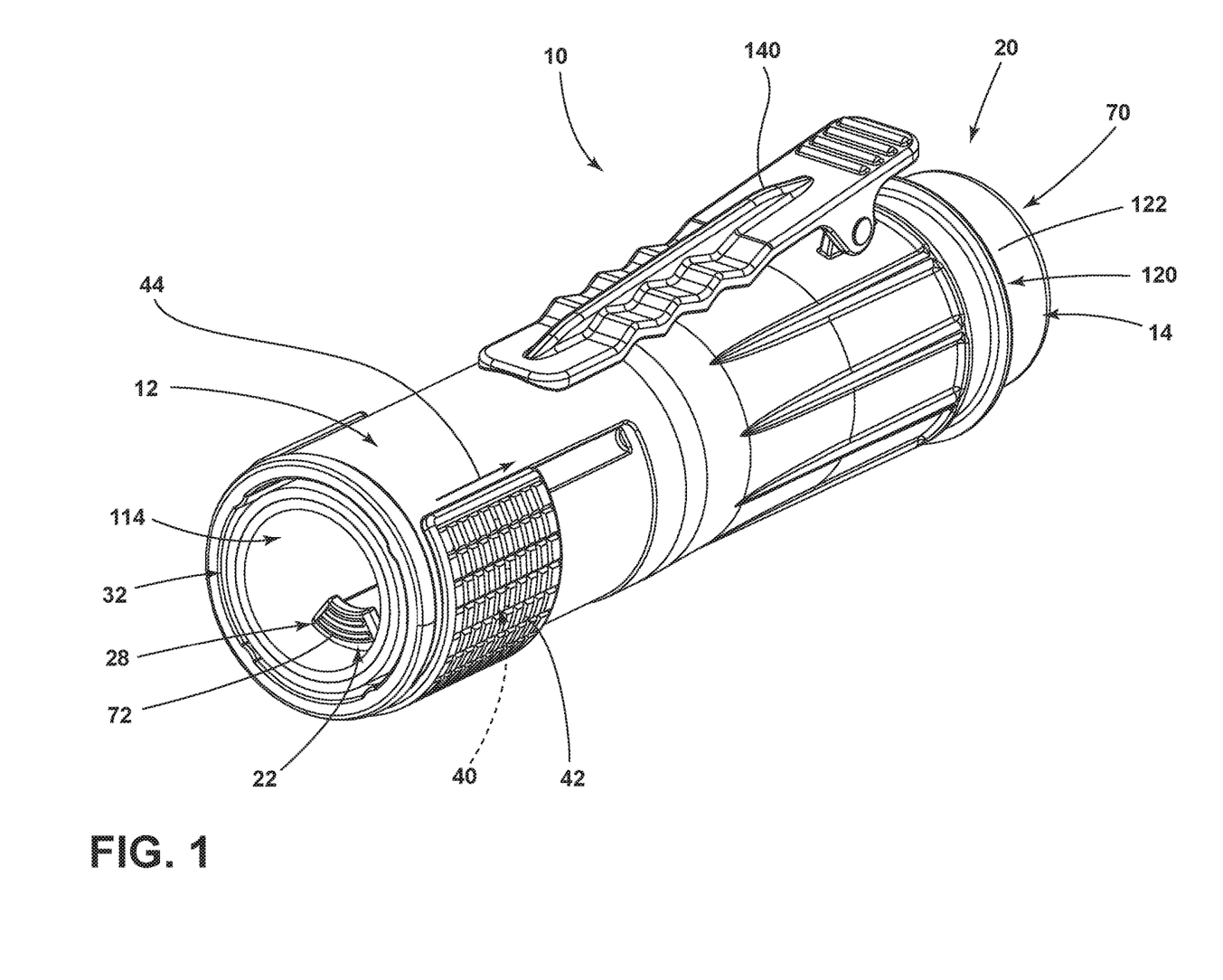
FIG. 1 is a side perspective view of the telescopic game call shown in the collapsed position.
Figure 2:
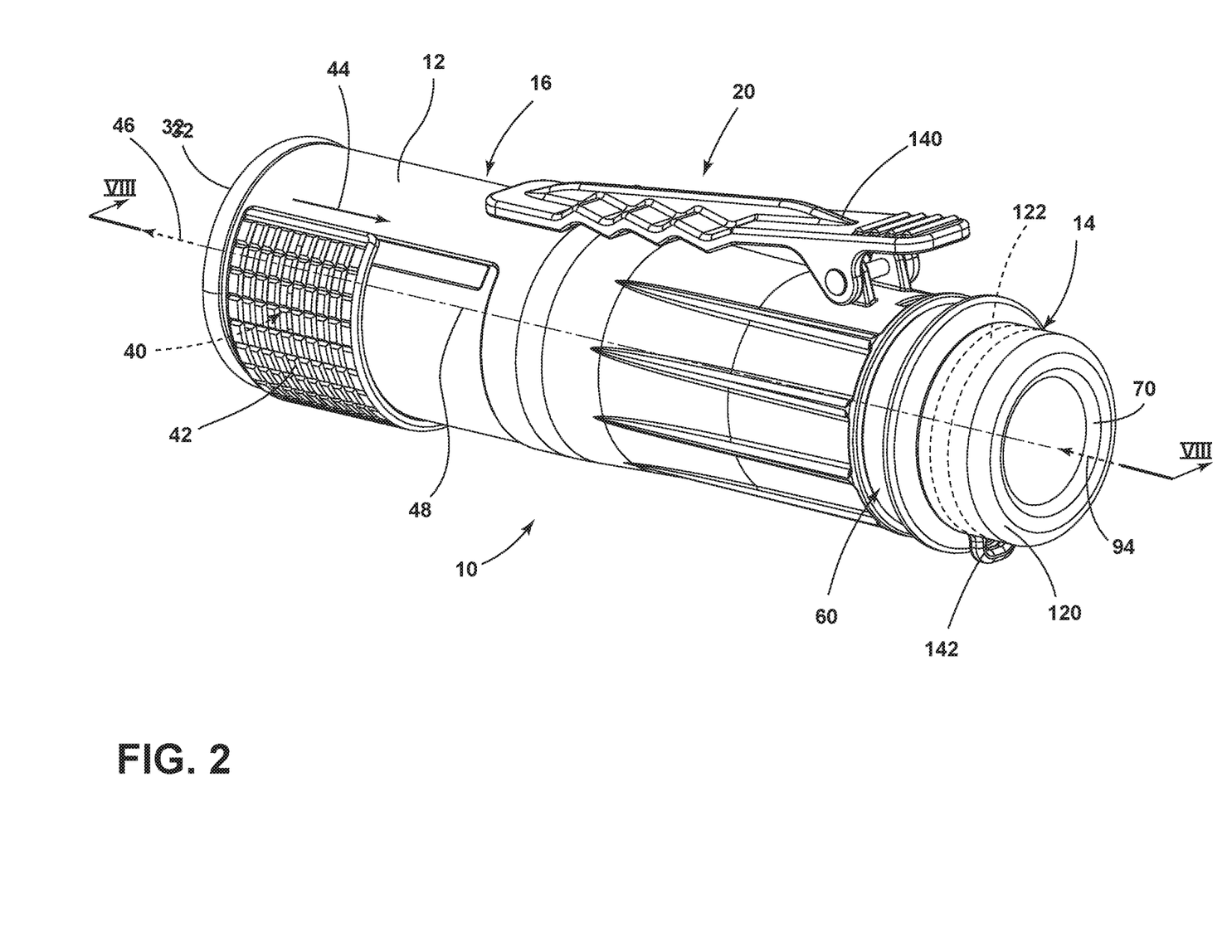
FIG. 2 is another side perspective view of a telescopic game call of FIG. 1.
Figure 3:
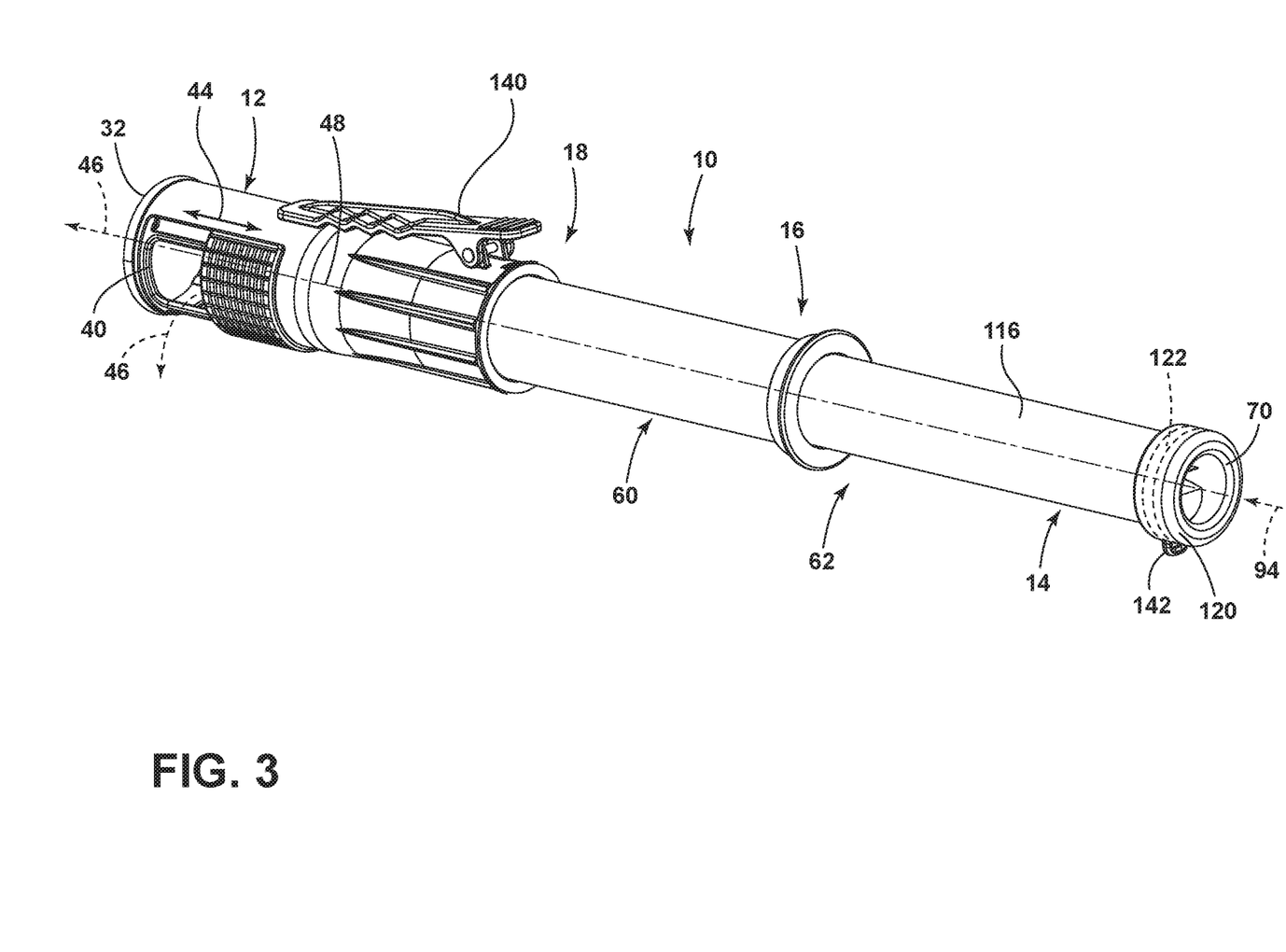
FIG. 3 is a perspective view of the telescopic game call of FIG. 2 shown in an extended position.
Figure 4:
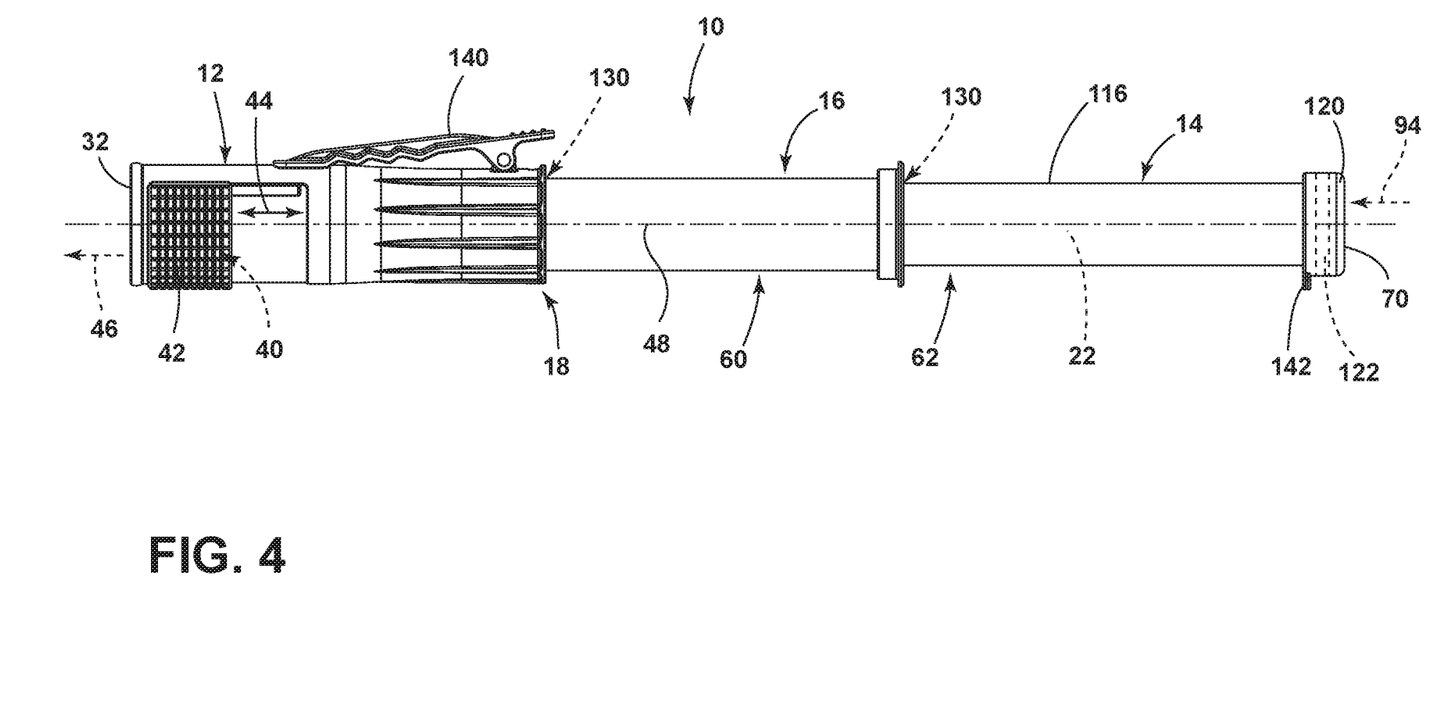
FIG. 4 is a side elevational view of the telescopic game call of FIG. 3 and showing a sliding member in a closed position.
Figure 5:
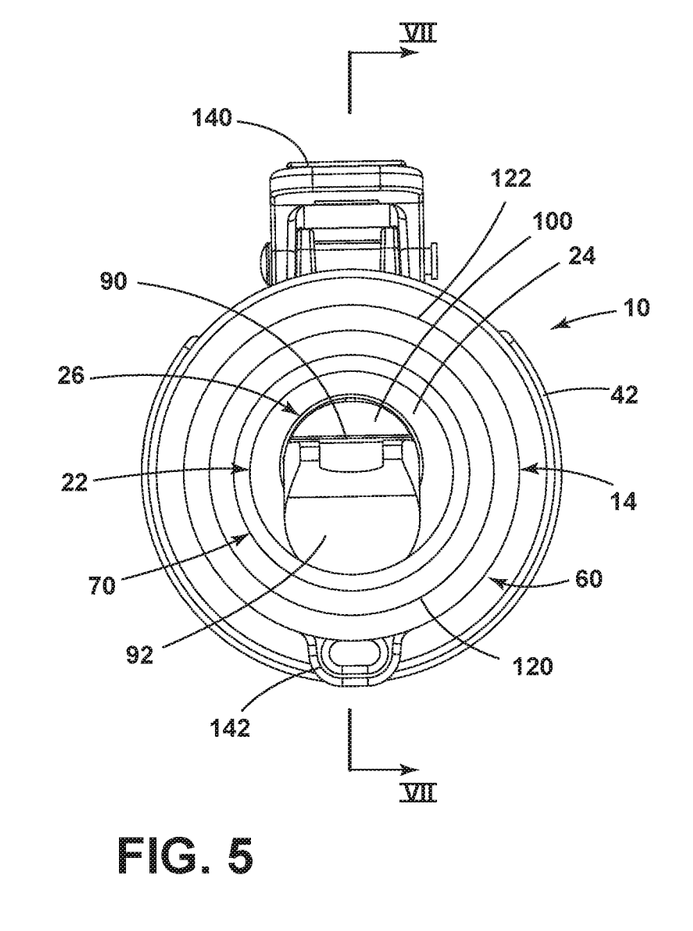
FIG. 5 is a first end elevational view of the telescopic game call of FIG. 4.
Figure 6:
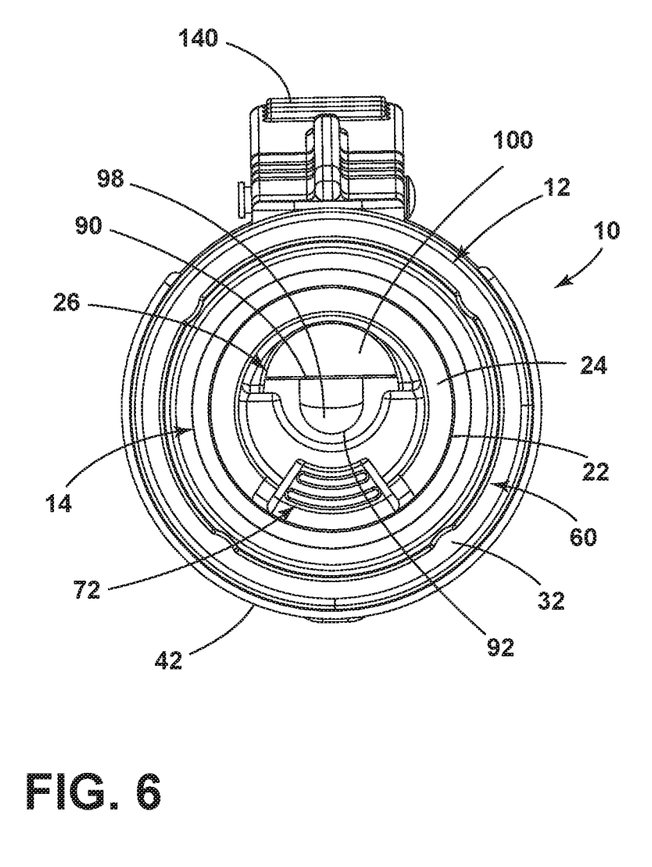
FIG. 6 is a second end elevational view of the telescopic game call of FIG. 4.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-9, reference numeral 10 generally refers to a telescopic game call that can be used for mimicking or reproducing sound similar to vocalizations of game animals in order to lure these game animals to a desired location, typically near the user of the telescopic game call 10. These telescopic game calls 10 can be used to attract game animals for hunting, photography, research and other similar uses where luring an animal to a particular area may be desirable. According to various aspects of the device, a telescopic game call 10 can include a first resonant member 12 and a second resonant member 14 that is telescopically operable within the first resonant member 12 between a plurality of telescopic positions 16. These telescopic positions 16 can include a collapsed position 20 and a plurality of extended positions 62, including a fully extended position 18. A harmonic carriage 22 is included within the second resonant member 14, where the harmonic carriage 22 includes a body 24 and a reed assembly 26 that is coupled with the body 24. The harmonic carriage 22 is slidably operable within the second resonant member 14 to define a plurality of resonant positions 28. The first and second resonant members 12, 14 and the harmonic carriage 22 are slidably operable relative to one another to adjust a resonant length 30 of the telescopic game call 10. This resonant length 30 is a length that can be defined between the reed assembly 26 of the harmonic carriage 22 and a resonating end 32 of the first resonant member 12.

Included within the first resonant member 12 is a side aperture 40 that is positioned near the resonating end 32 of the first resonant member 12. A slidable cover 42 is axially and slidably operable in an axial direction 44 to open, partially open, or cover the side aperture 40. This side aperture 40 can be used to direct output sound 46 from a telescopic game call 10 in a direction generally perpendicular to a longitudinal axis 48 of the telescopic game call 10.

According to various aspects of the device, a third resonant member 60 is positioned between the first and second resonant members 12, 14 to define a three-part telescopic assembly that forms the telescopic game call 10. It is contemplated that additional resonant members can be included within the telescopic game call 10 to further increase the resonant length 30 of the telescopic game call 10 in the fully-extended position 18, and also define a greater number of extended positions 62 of the plurality of telescopic positions 16. As the telescopic game call 10 is moved between the collapsed position 20 and one of the extended positions 62, the resonant length 30 of the telescopic game call 10 is changed. This change in the resonant length 30 of the telescopic game call 10 also modifies the output sound 46 that is produced by the telescopic game call 10. A longer resonant length 30 can produce a lower or deeper output sound 46 that may be indicative of a buck grunt call. When the telescopic game call 10 is moved into or toward the collapsed position 20, the resonant length 30 of the telescopic game call 10 is shortened and the output sound 46 produced through use of the telescopic game call 10 may have a higher frequency that may be indicative of a doe grunt call or smaller game animal. Depending upon the desired tone of the output sound 46 for the telescopic game call 10, the telescopic game call 10 can be moved between the plurality of telescopic positions 16 to produce a desired output sound 46 that may be useful in a particular territory, during a particular time of year, in a particular geographic location, and with respect to a particular game animal.

Figure 8:
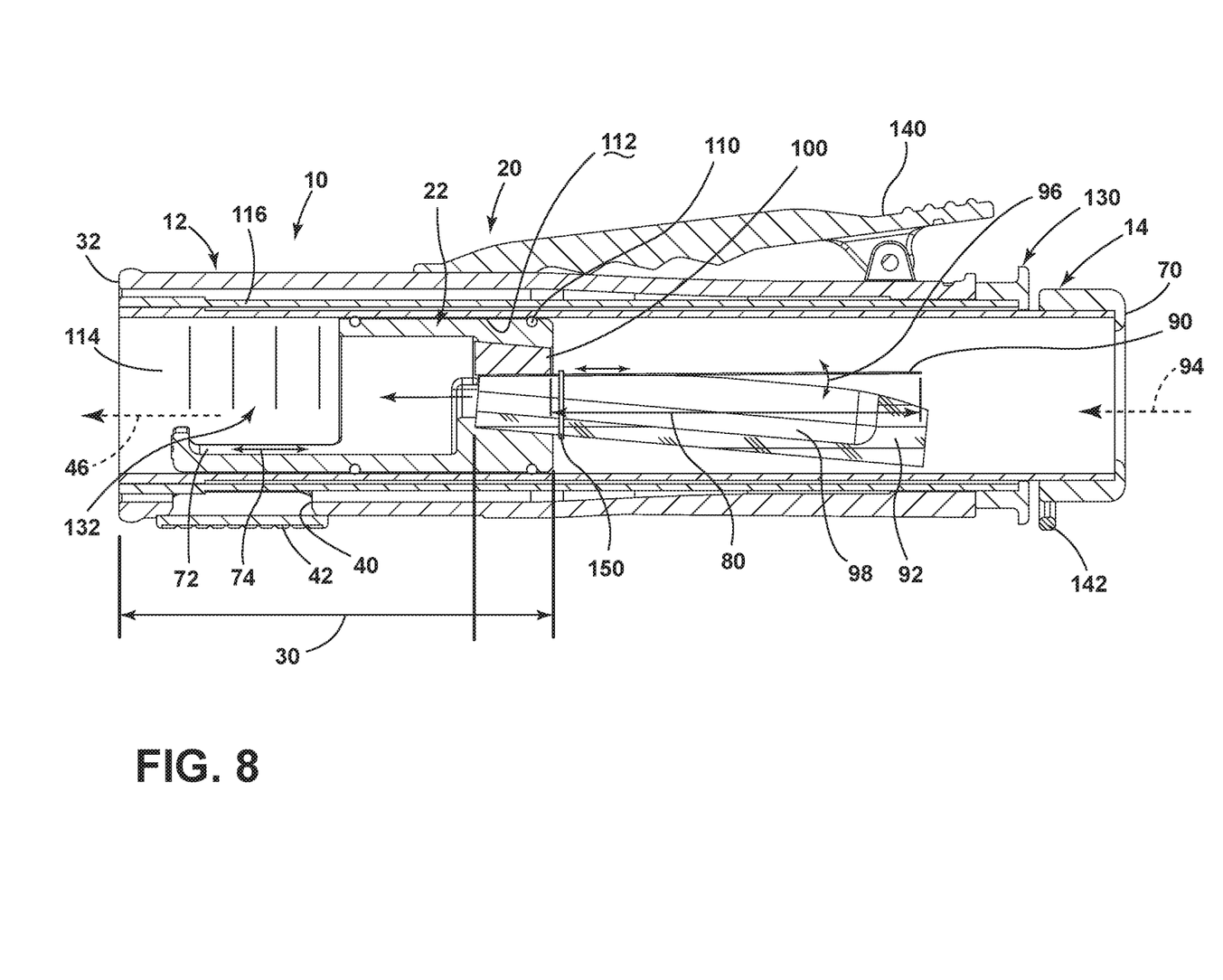
FIG. 8 is a cross-sectional view of the telescopic game call of FIG. 2 taken along line VIII-VIII.
Figure 9:
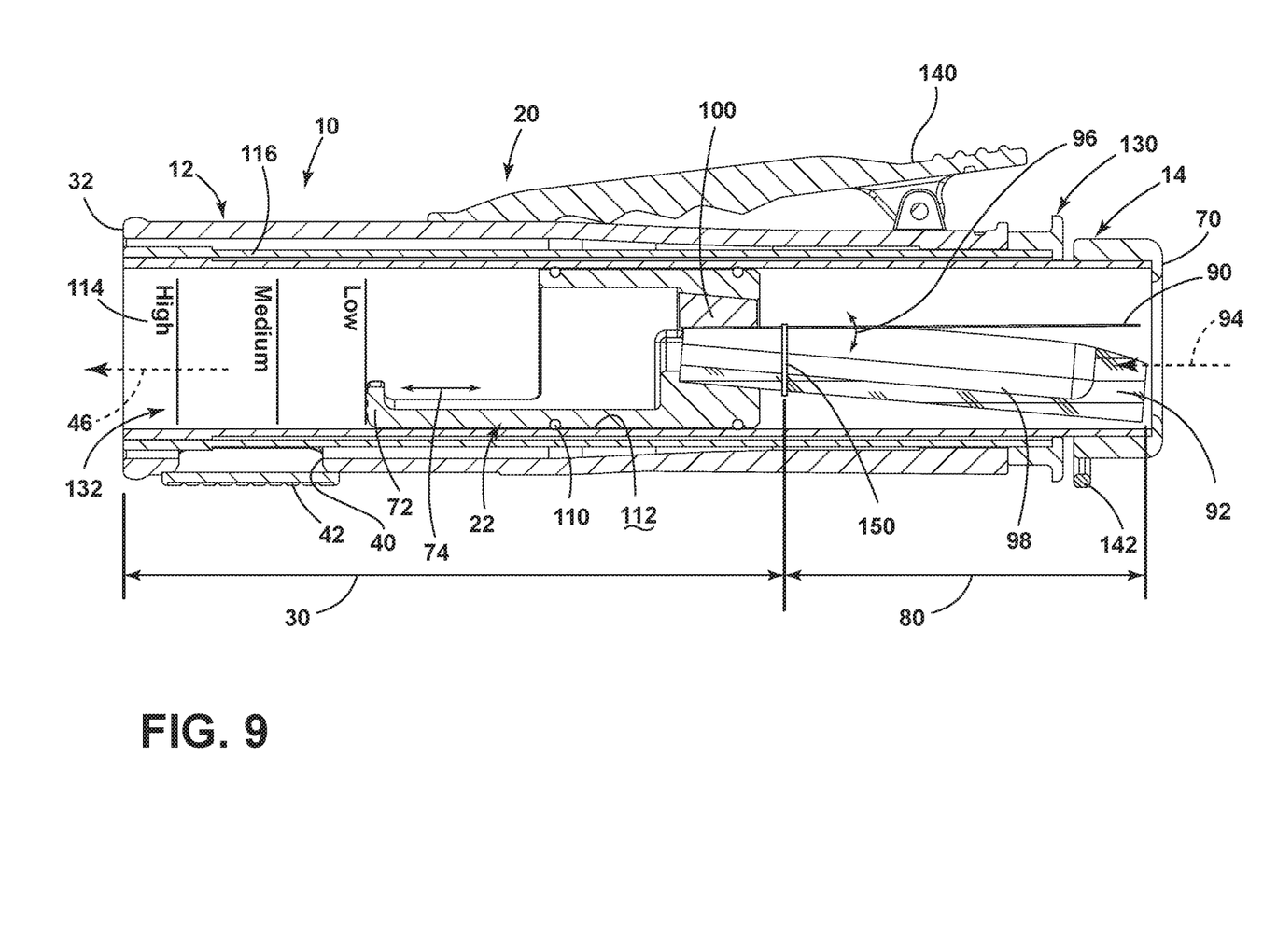
FIG. 9 is a schematic cross-sectional view of the telescopic game call of FIG. 8 showing operable positions of the harmonic carriage that includes the reed assembly.
Figure 10:
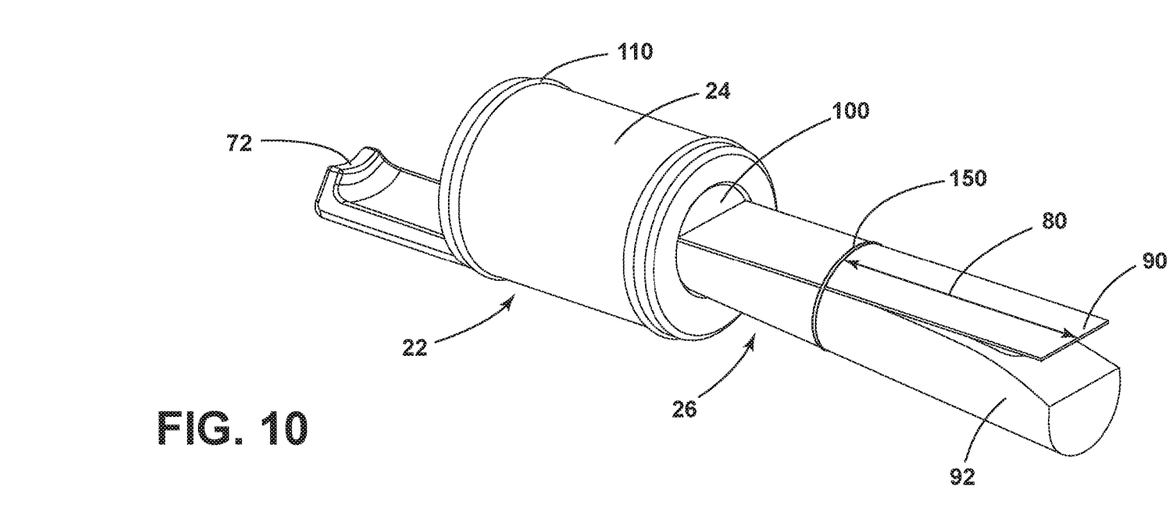
FIG. 10 is a first perspective view of the harmonic carriage for use within the telescopic game call.
Figure 11:
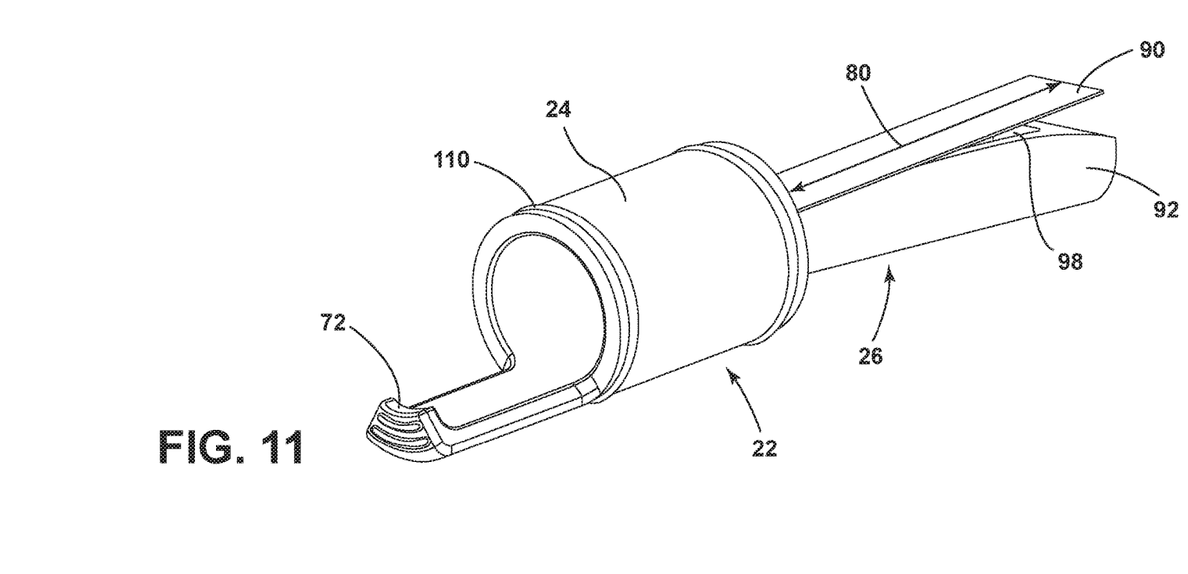
FIG. 11 is a second perspective view of the harmonic carriage for the telescopic game call.

As exemplified in FIGS. 8 and 9, the harmonic carriage 22 is slidably operable within the second resonant member 14. Movement of the harmonic carriage 22 within the second resonant member 14 can increase the customization options of the output sound 46 produced by the telescopic game call 10. Where the harmonic carriage 22 is moved toward a blowing end 70 of the second resonant member 14, the resulting sound may have a lower frequency as the resonant length 30 of the telescopic game call 10 is increased. As the harmonic carriage 22 is moved toward the resonating end 32 of the telescopic game call 10, the output sound 46 produced through use of the telescopic game call 10 is indicative of a higher tone or higher pitch due to the decrease in the resonant length 30 of the telescopic game call 10. Adjustment of the first, second and third resonant members 12, 14, 60 and the harmonic carriage 22 can provide other tonal and harmonic modifications to the output sound 46.

In order to operate the position of the harmonic carriage 22 within the second resonant member 14, the body 24 of the harmonic carriage 22 can include a grasping tab 72 that can be operated through the resonating end 32 of the first resonant member 12. By manipulating the grasping tab 72, a user can adjust the position of the harmonic carriage 22 within the second resonant member 14. The grasping tab 72 can be used to pull or push the body 24 of the harmonic carriage 22 between the plurality of harmonic positions 74 of the harmonic carriage 22.

According to various aspects of the device, as exemplified in FIGS. 8-11, the harmonic carriage 22 can be slidably removed from the second resonant member 14 and a separate selected harmonic carriage 22 can be slidably installed within the telescopic game call 10. Through this configuration, a user of the telescopic game call 10 may have a plurality of harmonic carriages 22, each having a different or dedicated reed assembly 26, that can be selectively and alternatively installed within the second resonant member 14. Each dedicated reed assembly 26 can be used for producing different output sounds 46 through the use of a telescopic game call 10. By way of example, and not limitation, one harmonic carriage 22 may include a reed 90 having a particular harmonic length 80. A separate harmonic carriage 22 may include a reed 90 having a different harmonic length 80 or reed length that can be used to produce a predetermined sound signature and different output sound 46. Other variations in the configurations of the various harmonic carriages 22 can be useful to produce different sounds.

As exemplified in FIGS. 8-11, the reed assembly 26 of the various harmonic carriages 22 used within the telescopic grunt call include a reed 90 and a soundboard 92. When a user blows through the blowing end 70 of a telescopic game call 10, air 94 moving through the telescopic game call 10 causes a vibration 96 of the reed 90 against the soundboard 92. This vibration 96 of the reed 90 relative to the soundboard 92 produces a harmonic vibration 96 that can be amplified or modified based upon the resonant length 30 and harmonic length 80 of the telescopic game call 10. The soundboard 92 can also include a trough 98 that can further amplify or modify the tone produced by the vibration 96 of the reed 90 against the soundboard 92 for producing a particular output sound 46 through use of a telescopic game call 10. In order to position the reed 90 against the soundboard 92, a wedge 100 is positioned between the body 24 and the reed 90. In this configuration, the wedge 100 biases a portion of the reed 90 against the soundboard 92 to maintain the engagement between these two members for producing the output sound 46 during use of the telescopic game call 10.

According to various aspects of the device, the materials used for the reed 90, the soundboard 92 and trough 98, the wedge 100 and the body 24 of the harmonic carriage 22 can be varied to produce different output sounds 46. These variations among the different configurations of harmonic carriages 22 can be removed and replaced within the telescopic game call 10 for producing different output sounds 46. Accordingly, a single telescopic game call 10 can include a plurality of harmonic carriages 22 that can be removed and replaced depending upon the desired output sound 46. Accordingly, a single telescopic game call 10 can be used to call a wide variety of game, and in a variety of locations and conditions, depending upon the harmonic carriage 22 disposed within the second resonant member 14 of the telescopic game call 10.

By way of example, and not limitation, various harmonic carriages 22 can be used to call a wide variety of game that can include, but are not limited to, deer, elk, duck, geese, other fowl, other species within the cervidae family, that may use vocalizations.

In order to seal the harmonic carriage 22 against the inner surface 112 of the second resonant member 14, the body 24 for the harmonic carriage 22 can include one or more gaskets 110 that extend around the circumference of the body 24 to seal against the inner surface 112 of the second resonant member 14. These gaskets 110 or seals are used to focus the vibration 96 generated by the reed 90 and soundboard 92 to be directed through the resonating chamber 114 formed by the first, second and third resonant members 12, 14, 60 of the telescopic game call 10. The at least one gasket 110 harmonically isolates the harmonic carriage 22 with respect to the second resonant member 14. In this manner, the at least one elastomeric gasket 110 prevents the loss of these vibrations 96 through a rattling or undesirable vibration 96 between the body 24 of the harmonic carriage 22 and the outer wall 116 of the second resonant member 14. The use of the elastomeric gasket 110 also provides for a consistent and repeatable sound by isolating the reed assembly 26 from the outer wall 116 of the second resonant member 14. Through this configuration, the harmonics and vibrations 96 generated by the reed assembly 26 are directed through the resonating chamber 114 of the telescopic game call 10.

In certain aspects of the device, as exemplified in FIGS. 8-11, the harmonic carriage 22 can include a plurality of elastomeric gaskets 110, typically two gaskets 110. These gaskets 110 provide a stable engagement between the harmonic carriage 22 and the outer wall 116 of the second resonant member 14. Accordingly, in addition to preventing a loss of vibration 96, the gaskets 110 also securely position the reed assembly 26 within the resonating chamber 114.

According to various aspects of the device, as exemplified in FIGS. 1-9, the first, second and third resonant members 12, 14, 60 of the telescopic game call 10 can be made of various materials. These materials can include relatively sturdy materials that can withstand potentially rugged use during use and transport. By way of example, and not limitation, the second resonant member 14 can be made of carbon fiber which can produce a smooth and generally slidable surface that can be used to conveniently slide the harmonic carriage 22 with respect to the inside surface of the second resonant member 14. The first and third resonant members 12, 60 can also be made of similar materials, or can be made of dissimilar materials depending upon the configuration of the telescopic game call 10.

As with the materials of the reed assembly 26 and harmonic carriage 22, the materials of the first, second and third resonant members 12, 14, 60 can vary depending upon the desired output sound 46 to be generated through use of the telescopic game call 10. Materials that can be used for producing the first, second and third resonant members 12, 14, 60 of the telescopic game call 10 can include, but are not limited to, carbon fiber, plastic, various polymers, metals, wood, composite materials, combinations thereof, and other similar materials that can be used to produce the desired resonating output sound 46 for the telescopic game call 10. As discussed above, the material of the first, second and third resonant members 12, 14, 60 of the telescopic game call 10 may be made of a similar material, or be made of a dissimilar material. As exemplified in FIG. 7, the first resonant member 12 may be made of a plastic or metallic material and the second and third resonant members 14, 60 may be made of carbon fiber.

Referring now to FIGS. 8 and 9, the second resonant member 14 can include a mouthpiece 120 that is positioned at the blowing end 70 of the second resonant member 14. This mouthpiece 120 can include a bite grip 122 that is integrally formed therein. The use of the bite grip 122 can provide for a single-handed operation of the telescopic game call 10 between the plurality of telescopic positions 16.

During use of the telescopic game call 10, it may be desirable to reproduce a particular telescopic position 16 of the telescopic game call 10. Accordingly, a particular fixing mechanism 130 can be coupled to various portions of the first, second and third resonant members 12, 14, 60 to record or set a particular resonant length 30 of the telescopic game call 10. By recording or setting this position, the telescopic game call 10 can be easily moved to the collapsed position 20 and then extended outward to the desired resonant position 28 or telescopic position 16 that may be short of the fully-extended position 18 of the telescopic game call 10. These fixing mechanisms 130 can be used in conjunction with the bite grip 122 incorporated within the mouthpiece 120 of the second resonant member 14 to conveniently extend the telescopic game call 10 to the desired telescopic position 16, without requiring additional fine tuning.

As discussed above, the telescopic game call 10 can include a plurality of harmonic carriages 22 that can be removed and replaced for modifying the output sound 46 produced by the telescopic game call 10. According to various aspects of the device, the grasping tab 72 included within the bodies of the various harmonic carriages 22 can be accessed when the telescopic game call 10 is in the collapsed position 20. The grasping tab 72 of the body 24 for the harmonic carriage 22 can be accessed by reaching through the resonating end 32 of the first resonant member 12 and pulling the harmonic carriage 22 outward through the resonating end 32 of the telescopic game call 10. A replacement harmonic carriage 22 can then be inserted through the resonating end 32 of the telescopic game call 10 and moved to a particular harmonic position 74 within the second resonant member 14. The inner surface 112 of the second resonant member 14 can include a plurality of indicia 132 or other markings to identify a particular harmonic position 74 of the harmonic carriage 22 within the second resonant member 14 as well as identifiable telescopic positions 16 of the game call 10. Accordingly, use of the telescopic game call 10 can provide repeatable harmonic positions 74, and, in turn, reproducible sounds where the user can identify a "favorite" telescopic position 16, resonant length 30 and/or harmonic position 74 of the various components of the telescopic game call 10.

According to various aspects of the device, the telescopic game call 10 can include various accessory components that can include, but are not limited to, a clipping member or belt clip 140, a loop 142 for receiving a lanyard, various gripping features for manipulating the telescopic game call 10 between the plurality of telescopic positions 16, and other similar accessory features. These accessory components can also be used to produce other forms of calls or game-attracting sounds that can be used in combination with the output sound 46. By way of example, and not limitation, the belt clip 140 can be attached to the first resonant member 12. The belt clip 140 can include a spring or other resilient or biasing mechanism that biases the belt clip 140 against the first resonant member 12. Using this configuration, the belt clip 140 can be "snapped" against the first resonant member 12 to produce a sound similar to that of breaking branches. The hollow configuration of the first resonant member 12 and the game call 10, in general, can be used to amplify or project these sounds from the game call 10.

According to various aspects of the device, the reed assembly 26 for the various harmonic carriages 22 can include various manually-operable fixtures for changing the harmonic length 80 of the reed 90 within the reed assembly 26. By way of example, and not limitation, an elastic member 150 can be extended around the reed 90 or around the reed 90 and the soundboard 92 for the reed assembly 26 for changing the harmonic length 80 of the reed assembly 26 to produce a higher, lower or modified tone during use of the telescopic game call 10. According to various aspects of the device, this can be a rubber band or other elastic member 150 that can be extended around a portion of the reed assembly 26.

Figure 7:
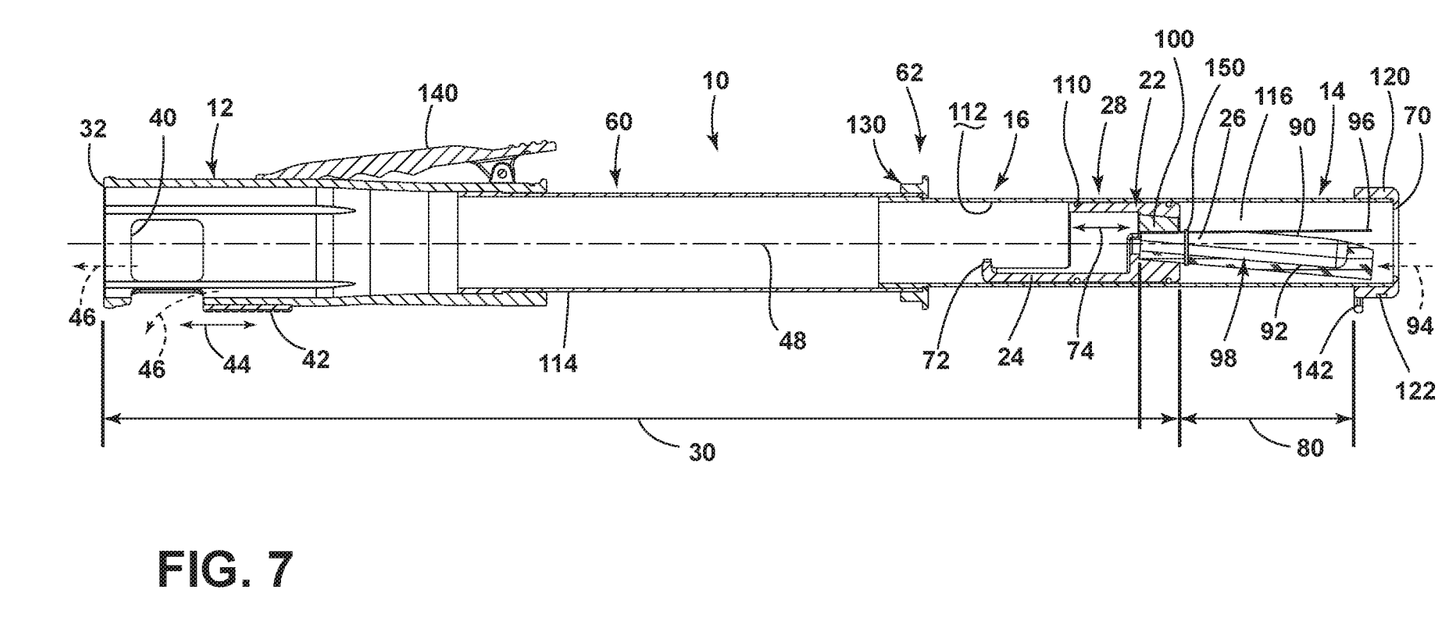
FIG. 7 is a cross-sectional view of the telescopic game call of FIG. 5 taken along VII-VII.

According to various aspects of the device, as exemplified in FIGS. 7-9, during use of the telescopic game call 10, a user blows air 94 through the mouthpiece 120. This air 94 moves between the reed 90 and the soundboard 92 for the reed assembly 26 of the harmonic carriage 22 and generates a vibration 96 of the reed 90 relative to the soundboard 92. As discussed above, the body 24 of the harmonic carriage 22 includes various sealing members or gaskets 110 that prevent air 94 from escaping around the body 24 of the harmonic carriage 22. Through the use of the gaskets 110, all or substantially all of the air 94 blown into the mouthpiece 120 is focused through the area between the reed 90 and soundboard 92. After leaving this harmonic trough 98 between the reed 90 and soundboard 92, air 94 passes continually through the remainder of a telescopic game call 10 and through the resonant length 30 of the telescopic game call 10. It is contemplated that a user can place a hand or other obstruction over the resonating end 32 of the first resonant member 12 of the telescopic game call 10. During such use, the side aperture 40 may be opened to allow for the escape of air 94 and the output sound 46 through use of the telescopic game call 10. Through these configurations, the output sound 46 can be directed along the central longitudinal axis 48 of the telescopic game call 10, perpendicular to the longitudinal axis 48, or both. By varying the direction of the output sound 46 produced by the telescopic game call 10, the source of the output sound 46 can be at least partially disguised. By disguising the location of the output sound 46, a game animal may have greater difficulty pinpointing the location of the source of the output sound 46. This may provide a user of the telescopic game call 10 an advantage when approaching game animal or luring a game animal to a particular area.

As discussed above, the bite grip 122 for the mouthpiece 120 of the telescopic game call 10 can provide for single-handed operation of the telescopic game call 10. Using this one-handed operation, a user can manipulate the slidable cover 42, with one hand, and change the telescopic position 16 of the telescopic game call 10 using a combination of the bite grip 122 and one hand. This allows the user to operate the telescopic game call 10 with one hand while also being able to hold a camera, binoculars, firearm, cross bow, bow, or other implement with the other hand. The ability to use a telescopic game call 10 with a single-handed operation can minimize the amount of sound that may be produced by the user during the process of luring a particular game animal to a desired location.

According to various aspects of the device, the components of the telescopic game call 10 are configured to provide for customization of the output sound 46 that can be produced during use of the telescopic game call 10. The first, second and third resonant members 12, 14, 60 and the manipulation of each to produce a particular telescopic length and/or resonant length 30, in combination with the customization of the harmonic carriage 22 to be modified, removed or replaced with any one of a plurality of harmonic carriages 22, provides for a high degree of customization during use of the telescopic game call 10. These customizable features of the telescopic game call 10 allows a user to own a single game call 10 that can be used in a wide range of geographic settings, seasonal settings, and weather settings, and can also be used to produce sounds for luring a wide range of animals to a particular location.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A game call, comprising:
a first resonant member;
a second resonant member that is telescopically operable within the first resonant member between a plurality of telescopic positions;
a slideable cover that is attached to the first resonant member, wherein the first resonant member includes a slide aperture for directing an output sound in a direction generally perpendicular to a longitudinal axis of the first and second resonant members, wherein the slidable cover slidably operates to at least partially cover the side aperture; and
a harmonic carriage having a body and a reed assembly, wherein
the harmonic carriage is slidably operable within the second resonant member;
the first and second resonant members and the harmonic carriage are slidably operable relative to one another to adjust a resonant length defined between the reed assembly and a resonating end of the first resonant member; and
the harmonic carriage is entirely contained within the second resonant member in each resonant length of the first and second resonant members and the harmonic carriage.

2. The game call of claim 1, wherein the slidable cover is axially operable in a direction parallel with the longitudinal axis of the first and second resonant members.

3. The game call of claim 1, further comprising a third resonant member that is positioned between the first and second resonant members and along a longitudinal axis of the first and second resonant members.

4. The game call of claim 1, wherein the harmonic carriage includes a grasping tab that is operable through the resonating end of the first resonant member when in a collapsed position of the plurality of telescopic positions, wherein the grasping tab is integrally formed with the body of the harmonic carriage, wherein the grasping tab is positioned within the second resonant member.

5. The game call of claim 4, wherein the harmonic carriage includes at least one gasket that engages an inner surface of the second resonant member and also harmonically isolates the harmonic carriage from the second resonant member.

6. The game call of claim 5, wherein the second resonant member includes a plurality of indicia for defining a plurality of repeatable harmonic positions of the harmonic carriage with respect to the second resonant member.

7. The game call of wherein the harmonic carriage is slidably removable from the second resonant member through the resonating end of the first resonant member.

8. The game call of claim 1, wherein the first resonant member includes a clipping member configured to operate in cooperation with at least the first resonant member to reproduce a branch-breaking sound.

9. A game call, comprising:
a first resonant member;
a second resonant member that is telescopically operable within the first resonant member between a collapsed position and a plurality of extended positions; and
a harmonic carriage that is slidably operable within the second resonant member, and wherein;
the harmonic carriage is harmonically isolated from the first resonant member by at least one elastomeric gasket;
the harmonic carriage includes a grasping tab that is operable through a resonating end of the first member when in the collapsed position and the harmonic carriage and the grasping tab are contained within the second resonant member in each of the collapsed position and the plurality of extended positions;
the first and second resonant members and the harmonic carriage are slidably operable relative to one another to adjust a resonant length defined between a reed assembly and the resonating end of the first resonant member;
the first resonant member includes a side aperture for directing sound waves in a direction generally perpendicular to a longitudinal axis of the first and second resonant members; and
the first resonant member includes a slideable cover that slidably operates to at least partially cover the side aperture, the slidable cover being axially operable in a direction parallel with the longitudinal axis of the first and second resonant members.

10. The game call of claim 9, further comprising a third resonant member that is positioned between the first and second resonant members and along a longitudinal axis of the first and second resonant members.

11. The game call of claim 9, wherein the grasping tab is integrally formed with a body of the harmonic carriage.

12. The game call of claim 11, wherein the second resonant member includes a plurality of indicia for defining a plurality of repeatable harmonic positions of the harmonic carriage with respect to the second resonant member.

13. The game call of claim 9, wherein the first resonant member includes a clipping member configured to operate in cooperation with the second resonant member to reproduce a branch-breaking sound.

14. The game call of claim 9, wherein the harmonic carriage is slidably removable from the second resonant member through the resonating end of the first resonant member.

15. A game call, comprising:
a first resonant member;
a second resonant member that is telescopically operable within the first resonant member between a collapsed position and a plurality of extended positions; and
a plurality of harmonic carriages that are selectively and alternatively installed within the second resonant member, and wherein;
each harmonic carriage of the plurality of harmonic carriages includes a dedicated reed assembly having a predetermined sound signature;
each harmonic carriage is configured to be harmonically isolated from the second resonant member by at least one elastomeric gasket, the harmonic carriage including a body that defines a grasping tab for slidably adjusting the position of the harmonic carriage within the second resonant member, wherein the harmonic carriage and the grasping tab are positioned within the second resonant member in each of the collapsed position and the plurality of extended positions; and
the first and second resonant members and a selected harmonic carriage of the plurality of harmonic carriages are slidably operable relative to one another to adjust a resonant length defined between the dedicated reed assembly of the selected harmonic carriage and a resonating end of the first resonant member.

16. The game call of claim 15, further comprising a third resonant member that is positioned between the first and second resonant members and along a longitudinal axis of the first and second resonant members.

* * * * *

UNITED STATES PATENT AND TRADEMARK OFFICE
CERTIFICATE OF CORRECTION

| | |
|---|---|
| PATENT NO. | : 11,134,673 B2 |
| APPLICATION NO. | : 16/748894 |
| DATED | : October 5, 2021 |
| INVENTOR(S) | : Todd Pringnitz |

It is certified that error appears in the above-identified patent and that said Letters Patent is hereby corrected as shown below:

In the Claims

<u>Column 9</u>
Claim 7, Line 1, after "of" insert --claim 4,--.
Claim 9, Line 19, after "first" insert --resonant--.

Signed and Sealed this
Fourteenth Day of June, 2022

*Katherine Kelly Vidal*

Katherine Kelly Vidal
*Director of the United States Patent and Trademark Office*